(12) United States Patent
Morgan

(10) Patent No.: US 6,515,789 B1
(45) Date of Patent: Feb. 4, 2003

(54) COMPACT OPTICAL ASSEMBLY SYSTEMS AND DEVICES FOR USE IN OPTICAL COMMUNICATION NETWORKS

(75) Inventor: Peter J. Morgan, Glenelg, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/930,798

(22) Filed: Aug. 16, 2001

Related U.S. Application Data (60) Provisional application No. 60/225,816, filed on Aug. 16, 2000.

(51) Int. Cl.[7] .............................. G02F 1/09; G02F 1/00

(52) U.S. Cl. ...................................... 359/280; 359/324

(58) Field of Search ................................. 359/280, 245, 359/320, 324; 385/33, 34

(56) References Cited

U.S. PATENT DOCUMENTS

| | | | |
|---|---|---|---|
| 5,521,741 A | 5/1996 | Umezawa et al. | 359/246 |
| 5,867,300 A | 2/1999 | Onaka et al. | 359/283 |
| 5,973,821 A | 10/1999 | Onaka et al. | 359/283 |
| 6,103,010 A | 8/2000 | Belouet | 117/108 |
| 6,309,557 B1 * | 10/2001 | Ooido et al. | 252/62.57 |
| 6,395,126 B1 * | 5/2002 | Cullen et al. | 156/293 |
| 2002/0021484 A1 * | 2/2002 | Onaka et al. | 359/283 |

* cited by examiner

*Primary Examiner*—Georgia Epps
*Assistant Examiner*—William Choi (57) ABSTRACT

The present invention is directed to an optical assembly with a substrate. A non-latching optical component is attached to the substrate and includes a non-latching garnet and a permanent magnet in magnetic communication with the garnet. Also, a latching optical component is attached to the substrate and includes a latching garnet. A magnetic shield is between the non-latching optical component and the latching optical component.

20 Claims, 5 Drawing Sheets

COMPACT OPTICAL ASSEMBLY SYSTEMS AND DEVICES FOR USE IN OPTICAL COMMUNICATION NETWORKS

CROSS-REFERENCE TO RELATED APPLICATIONS

Not Applicable.

STATEMENT REGARDING FEDERALLY SPONSORED RESEARCH OR DEVELOPMENT

This application claims priority from U.S. Provisional Patent Application Ser. No. 60/225,816, filed Aug. 16, 2000, which is incorporated herein by reference.

BACKGROUND OF THE INVENTION

The present invention is directed generally to the transmission of signals in optical communications systems. More particularly, the invention relates to optical assemblies and apparatuses for use in optical communications systems.

The development of digital technology provided the ability to store and process vast amounts of information. While this development greatly increased information processing capabilities, it was soon recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical carrier by varying characteristics of the optical carrier. In most optical transmission systems, the information is imparted by using an information data stream to either directly or externally modulate an optical carrier so that the information is imparted at the carrier frequency or on one or more sidebands, with the later technique sometimes called upconversion or sub-carrier modulation ("SCM").

SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength. Generally, only one of the mirror images is required to carry the signal and the other image is a source of signal noise that also consumes wavelength bandwidth that would normally be available to carry information. Similarly, the carrier wavelength, which does not carry information in an SCM system, can be a source of noise that interferes with the subcarrier signal. Modified SCM techniques have been developed to eliminate one of the mirror images and the carrier wavelength, such as described in U.S. Pat. Nos. 5,101,450 and 5,301,058.

Initially, single wavelength carriers were spatially separated by placing each carrier on a different fiber to provide space division multiplexing ("SDM") of the information in optical systems. As the demand for capacity grew, increasing numbers of information data streams were spaced in time, or time division multiplexed ("TDM"), on the single wavelength carrier in the SDM system as a means to better use the available bandwidth. The continued growth in demand has spawned the use of multiple wavelength carriers on a single fiber using wavelength division multiplexing ("WDM"). In WDM systems, further increases in transmission capacity can be achieved not only by increasing the transmission rate of the information on each wavelength, but also by increasing the number of wavelengths, or channel count, in the system.

There are two general options for increasing the channel count in WDM systems. The first option is to widen the transmission bandwidth to add more channels at current channel spacings. The second option is to decrease the spacing between the channels to provide a greater number of channels within a given transmission bandwidth. The first option currently provides only limited benefit, because most optical systems use erbium doped fiber amplifiers ("EDFAs") to amplify the optical signal during transmission. EDFAs have a limited bandwidth of operation and suffer from non-linear amplifier characteristics within the bandwidth. Difficulties with the second option include controlling optical sources that are closely spaced to prevent interference from wavelength drift and nonlinear interactions between the signals.

A further difficulty in WDM systems is that chromatic dispersion, which results from differences in the speed at which different wavelengths travel in optical fiber, can also degrade the optical signal. Chromatic dispersion is typically controlled using one or more of three techniques. One technique is to offset the dispersion of the different wavelengths in the transmission fiber through the use of optical components such as Bragg gratings or arrayed waveguides that vary the relative optical paths of the wavelengths. Another technique is to intersperse different types of fibers that have opposite dispersion characteristics to that of the transmission fiber. A third technique is to attempt to offset the dispersion by prechirping the frequency or modulating the phase of the carrier source in addition to modulating the data onto the carrier. For example, see U.S. Pat. Nos. 5,555,118, 5,778,128, 5,781,673 or 5,787,211. These techniques require that additional components be added to the system and/or the use of specialty optical fiber that has to be specifically tailored to each length of transmission fiber in the system.

New fiber designs have been developed that substantially reduce the chromatic dispersion of WDM signals during transmission in the 1550 nm wavelength range, such as dispersion shifted fiber and non-zero dispersion shifted fiber. However, the decreased dispersion of the optical signal allows for increased nonlinear interaction between channels, such as four wave mixing, which increases signal degradation. The effect of lower dispersion on nonlinear signal degradation becomes more pronounced at increased bit transmission rates due to the higher signal launch power at higher bit rates.

Non-linear interactions can be significantly reduced if the data signals are linearly polarized and oriented orthogonal to each other. For example, see U.S. Pat. No. 5,111,322, issued on May 5, 1992. Such systems, however, can be problematic. For example, the system taught in the '322 Patent requires two modulators to produce a pair of orthogonal signals. As a result, the size, cost, and power consumption of such systems will increase significantly as the number of WDM channels increase. There is a need to reduce the number of components, particularly expensive components like modulators, while at the same time reducing the effects of phenomenon such as chromatic dispersion and non-linear interactions.

With the increase in the number of wavelength channels comes the need for more components to process and transmit the channels. Because space is often limited where this transmission equipment is deployed, there is a need for the equipment to be as compact as possible. This leads to optical assemblies with very closely spaced components. These optical assemblies will contain various components that may produce magnetic fields. Various optical components have optical properties that are sensitive to magnetic fields. External magnetic fields can degrade the performance of optical components in the optical assemblies. As a result, there is a clear need for systems and apparatuses to protect optical components from magnetic fields in compact optical assemblies and optical communication systems.

BRIEF SUMMARY OF THE INVENTION

The present invention is directed to an optical assembly with a substrate. A non-latching optical component is attached to the substrate and includes a non-latching garnet and a permanent magnet in magnetic communication with the garnet. Also, a latching optical component is attached to the substrate and includes a latching garnet. A latching optical component as used herein means what is commonly known as a self-latching optical component. A magnetic shield is between the non-latching optical component and the latching optical component.

This and other embodiments of the present invention will be described in the following detailed description. The present invention addresses the needs described above in the description of the background of the invention by providing protection to closely spaced optical components in optical assemblies from external magnetic fields that might degrade the performance of the optical components. These advantages and others will become apparent from the following detailed description.

BRIEF DESCRIPTION OF THE DRAWINGS

Embodiments of the present invention will now be described, by way of example only, with reference to the accompanying drawings, wherein.

DETAILED DESCRIPTION OF THE INVENTION

Figure 1:
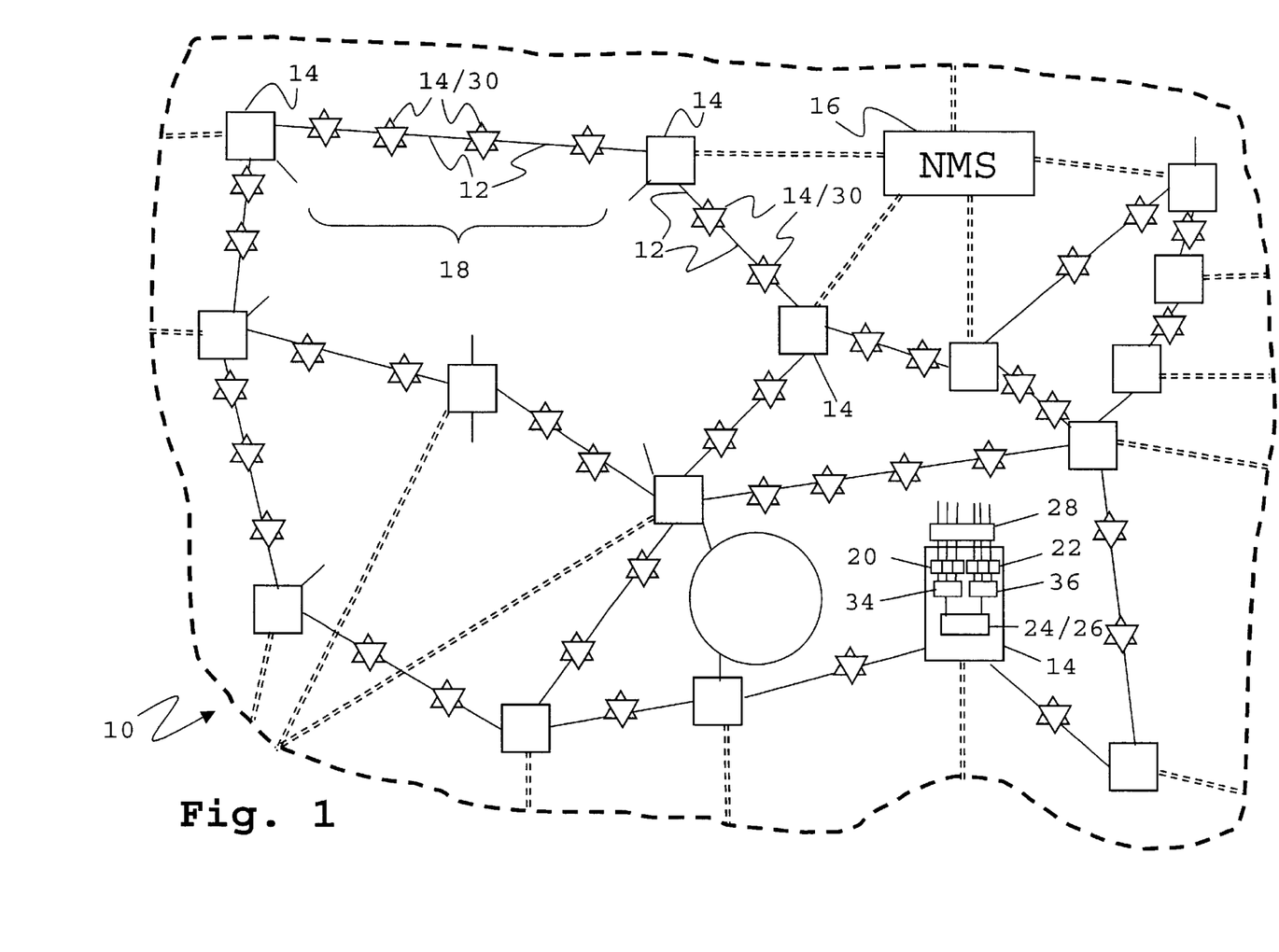
FIGS. 1 and 2 show examples of optical communications systems.

FIG. 1 shows an optical communications system 10 that includes optical paths 12 connecting network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various transmission schemes, such as space, time, code, frequency, phase, polarization, and/or wavelength division multiplexing, and other variations and combinations of multiplexing schemes. The system 10 can also include more or less features than those illustrated herein, such as by including a network management system ("NMS") 16 and changing the number, location, content, orientation, and connection of network elements 14.

The optical paths 12 can include guided and unguided paths or waveguides, such as one or more optical fibers, ribbon fibers, and free space devices, and can interconnect the network elements 14 establishing links 18 and providing optical communication paths through the system 10. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel.

The network elements 14 can include one or more signal processing devices including one or more of various optical and/or electrical components. The network elements 14 can perform network functions or processes, such as switching, routing, amplifying, multiplexing, combining, demultiplexing, distributing, or otherwise processing optical signal channels. For example, network elements 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one network element 14 is illustrated in FIG. 1, although many other variations and embodiments of network elements 14 are contemplated. Additional examples of network elements 14 are described in U.S. patent application Ser. No. 09/817,478, filed Mar. 26, 2001, and Ser. No. 09/253,819, filed Feb. 19, 1999, both of which are incorporated herein by reference.

The optical transmitters 20 and receivers 22 are configured respectively to transmit and receive optical signals including one or more information carrying optical signal wavelengths, or channels, via the optical paths 12. The transmitters 20 include an optical carrier source that provides an optical carrier and can utilize, for example, coherent or incoherent sources, narrow band or broad band sources, such as sliced spectrum sources, fiber lasers, semiconductor lasers, light emitting diodes, and other optical sources. The transmitters 20 often include a narrow bandwidth laser as the optical carrier source. The optical transmitter 20 can impart information to the optical carrier by directly modulating the optical carrier source or by externally modulating the optical carrier. Alternatively, the information can be imparted to an electrical carrier that can be upconverted onto an optical wavelength to produce the optical signal. Examples of optical transmitters 20 are described in U.S. Pat. No. 6,118,566, issued Sep. 12, 2000, which is incorporated herein by reference.

Similarly, the optical receiver 22 can include various detection techniques, such as coherent detection, optical filtering, and direct detection. Tunable transmitters 20 and receivers 22 can be used to provide flexibility in the selection of wavelengths used in the system 10.

The switches 24 can take many forms and can have different levels of "granularity". "Granularity refers to the resolution or precision with which the switching is performed. For example, WDM switches 24 can switch groups of wavelengths (also called "channels"), individual wavelengths, or portions of wavelengths. Before being switched, the signals can be demultiplexed into the appropriate level of granularity, and after being switched the signals can be multiplexed into the desired format, using the same or different modulation schemes, wavelengths, or other characteristics.

Switches can have electrical, optical, or electrical/optical switch "fabrics". The switch "fabric" describes the domain and/or manner in which the signal switching occurs.

Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use microelectromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in a liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 09/119,562, filed Jul. 21, 1998, and Ser. No. 60/150,218, filed Aug. 23, 1999, and PCT Patent Application PCT/US00/23051, filed Aug. 23, 2000, all of which are incorporated herein by reference.

Switches 24 can be grouped into two categories: interfacial switches 24 and integrated switches 24. Interfacial switches 24 perform one or more O-E-O conversions of the signals, either in the switch 24 itself or in a related component such as a multiplexer 34 or demultiplexer 36. Interfacial switches 24 are located within or at the periphery of networks 10, such as between two or more point to point links 18, between two or more networks 10, or between a network 10 and a point to point link 18. Interfacial switches 24 optically separate the links 18 and/or networks 10 because optical signals are converted into electrical form before being passed to the next optical link 18 or network 10. Interfacial switches 24 are a type of interfacial device 28, which is discussed in more detail herein below. In contrast, integrated switches are optically integrated into the network 10 and allow optical signals to continue through the network 10, via the switch 24, without an O-E-O conversion. Integrated switches 24 are sometimes called "all-optical switches", "O-O" switches, or "O-O-O" switches. A switch 24 can have both an integrated switch 24 portion and a interfacial switch 24 portion, such that some signals are switched without an O-E-O conversion, while other signals are subjected to an O-E-O conversion.

Add/drop multiplexers 26 and other devices can function in an manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10, having integrated switches 24 and integrated add/drop multiplexers 26, are not converted into electrical form until they reach their destination, or until the signals degrade to the point they need to be regenerated before further transmission. Of course, add/drop multiplexers 26 can also be interfacial devices 30 which subject signals to an O-E-O conversion.

Interfacial devices 28 optically separate and act as interfaces to and between optical networks 10 and/or point to point links 18. Interfacial devices 28 perform at least one optical to electrical or electrical to optical conversion before passing signals into or out of the link 18 or network 10. Interfacial device 28 can be located within or at the periphery of networks 10, such as between two or more networks 10, between two or more point to point links 18, and between networks 10 and point to point links 18. Interfacial devices 28 include, for example, cross-connect switches, IP routers, ATM switches, etc., and can have electrical, optical, or a combination of switch fabrics. Interfacial devices 28 provide interface flexibility and can be configured to receive, convert, and provide information in one or more various protocols, encoding schemes, and bit rates to the transmitters 20, and to perform the converse function for the receivers 22. The interfacial devices 28 also can be used to provide other functions, such as protection switching.

The optical amplifiers 30 can be used to provide signal gain, and can be deployed proximate to other optical components, such as in network elements 14, as well as along the optical communications paths 12. The optical amplifiers 30 can include concentrated/lumped amplification and/or distributed amplification, and can include one or more stages. The optical amplifier can include doped (e.g. erbium, neodymium, praseodymium, ytterbium, other rare earth elements, and mixtures thereof) and Raman fiber amplifiers, which can be locally or remotely pumped with optical energy. The optical amplifiers 30 can also include other types of amplifiers 30, such as semiconductor amplifiers.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more stages incorporating various multi-port device and filter combinations to multiplex, demultiplex, and/or broadcast signal wavelengths $\lambda_i$ in the optical systems 10.

The NMS 16 can manage, configure, and control network elements 14 and can include multiple management layers that can be directly and indirectly connected to the network elements 14. The NMS 16 can be directly connected to some network elements 14 via a data communication network (shown in broken lines) and indirectly connected to other network elements 14 via a directly connected network element and the optical system 10. The data communication network can, for example, be a dedicated network, a shared network, or a combination thereof. A data communications network utilizing a shared network can include, for example, dial-up connections to the network elements 14 through a public telephone system. Examples of an NMS 16 are described in U.S. patent application Ser. No. 60/177,625, filed Jan. 24, 2000, and PCT Patent Application PCT/US01/02320, filed Jan. 24, 2001, both of which are incorporated herein by reference.

Figure 2:
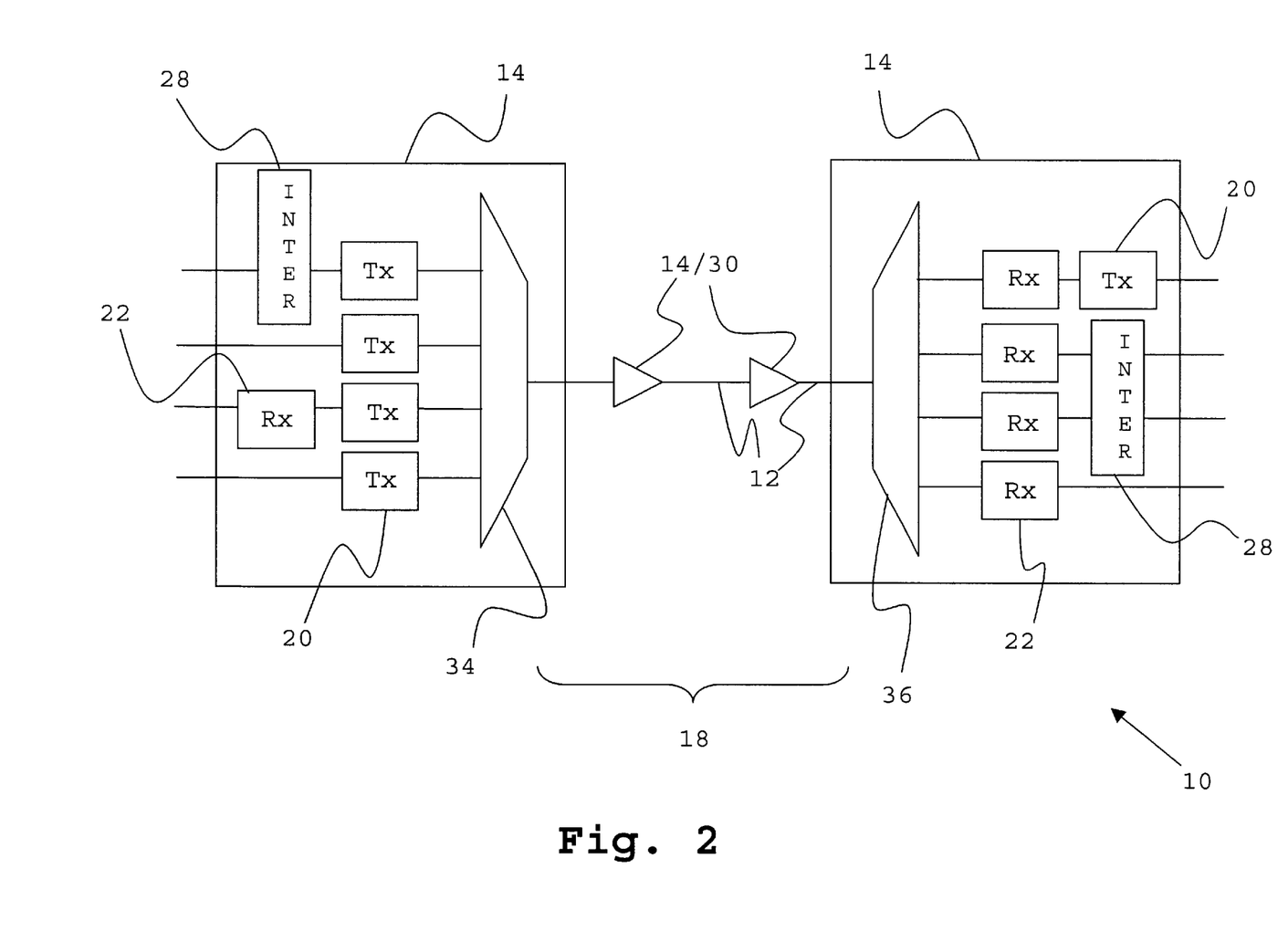

FIG. 2 shows another embodiment of the system 10 including a link 18 of four network elements 14. That system 10 can, for example, be all or part of a point to point system 10, or it may be part of a multi-dimensional, mesh, or other system 10. One or more of the network elements 14 can be connected directly to the network management system 16 (not shown). If the system 10 is part of a larger system, then as few as none of the network elements 14 can be connected to the network management system 16 and all of the network elements 14 can still be indirectly connected to the NMS 16 via another network element in the larger system 10.

Figure 3:
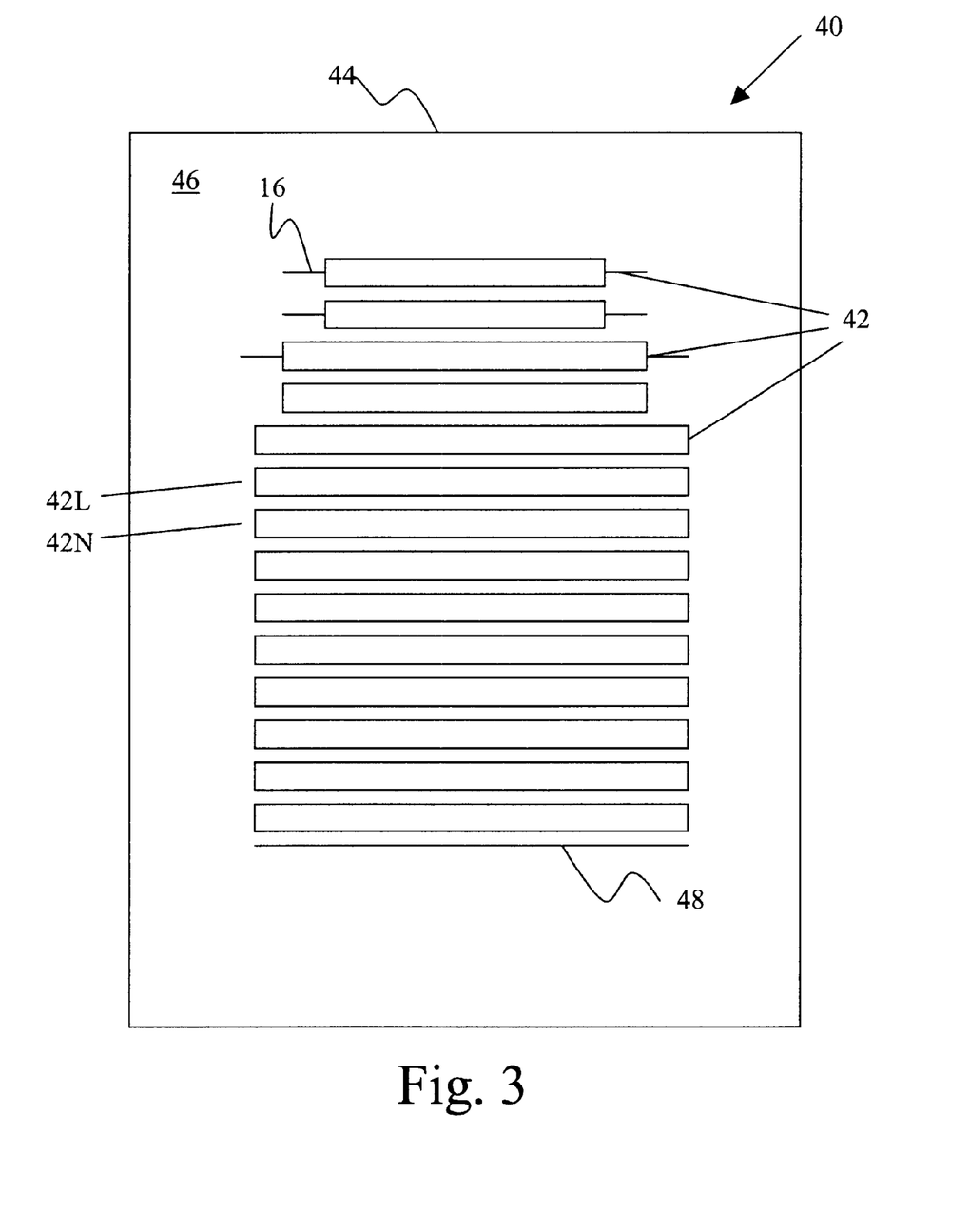
FIG. 3 shows an optical assembly embodiment.

The network elements 14 often contain optical assemblies 40, as depicted in FIG. 3. Optical assemblies include one or more optical components 42 generally assembled in trays 44. These include a substrate 46 and mounting surfaces 48 for retaining the optical components 42 along with optical fiber 16 coupled to the optical components 42.

Various optical components 42, such as isolators, circulators, magneto-optic switches, etc., have optical properties, e.g., insertion loss, that are sensitive to magnetic fields. The optical components 42 may include various magnetic materials, typically a garnet material, such as gadolinium gallium garnets ("GGG"), Ytterbium Iron Garnets, ("YIG"), Ytterbium Aluminum Garnets ("YAG"), etc. The magnetic materials may assume various orientations in the presence of a magnetic field that affect the optical properties of the material within the components 42. Some magnetic materials, referred to as latchable materials, will maintain an orientation induced by an external magnetic field, when the external magnetic field is removed. Other magnetic materials, referred as non-latchable materials, will not maintain an orientation when the external magnetic field is removed.

Optical components 42 that include non-latchable magnetic materials must include magnets positioned to maintain the magnetic orientation and material properties of the magnetic material. Whereas, optical components 42 that include latchable magnetic material do not require a permanent magnet to maintain the magnetic orientation of the magnetic material.

In WDM system 10, the optical components 42 must be assembled compactly to minimize the space required to house network elements 14. Thus, it is necessary to minimize the spacing between components 42 in the assemblies 40. As such, it may be necessary to include optical components 42 that include non-latchable materials, designated 42N, as well as optical components 42 that include latchable materials, designated 42L, in the same tray 44. However, it is recommended generally by component manufacturers that minimum distances in the range of 25 mm be maintained between optical components 42 in order to avoid the degradation of the self-latching magnetic field. With such interaction external magnetic fields may cause latchable optical components 42L to latch when they are not supposed to be latched. The maintenance of substantial spacings between components 42 is contrary to the need to construct network elements 14 that are more compact and space efficient.

In various embodiments of the present invention, the magnetically latchable optical components 42L are magnetically isolated from the other optical components in the tray 44. The magnetic isolation may be performed by providing the latchable component 42L with a shield 50, mounting the latchable component 42L in a magnetically grounded or shielded substrate 46 and/or mounting surface 48, and/or providing isolating magnets 52 oriented to provide an isolating magnetic field to suppress the influence of external magnetic fields.

Figure 4:
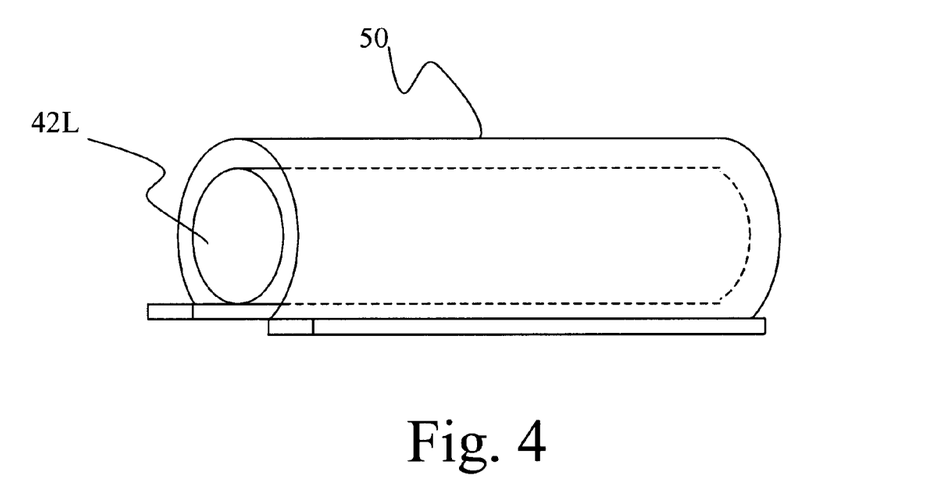
FIGS. 4–7 show magnetically isolated assembly embodiments.

FIG. 4 shows an embodiment of the latchable optical component 42L, in which the magnetic shield 50 substantially surrounds the latchable optical component 42L. The magnetic shield 50 is configured to isolate the latchable component 42L from external magnetic fields that could induce a sufficient change in the magnetic orientation to vary the optical properties of the latchable material. The embodiment shown in FIG. 4 is exemplary in that it shows an external shield substantially surrounding the latchable component 42L. Other embodiments could integrate the shield 50 into the latchable component 42L. Also, the shield 50 may completely surround the latchable component 42L. The shield 50 generally includes magnetically conductive materials that will conduct magnetic fields so as to act as a magnetic shield. Iron and/or nickel based materials are examples of such magnetically conductive materials.

Figure 5:
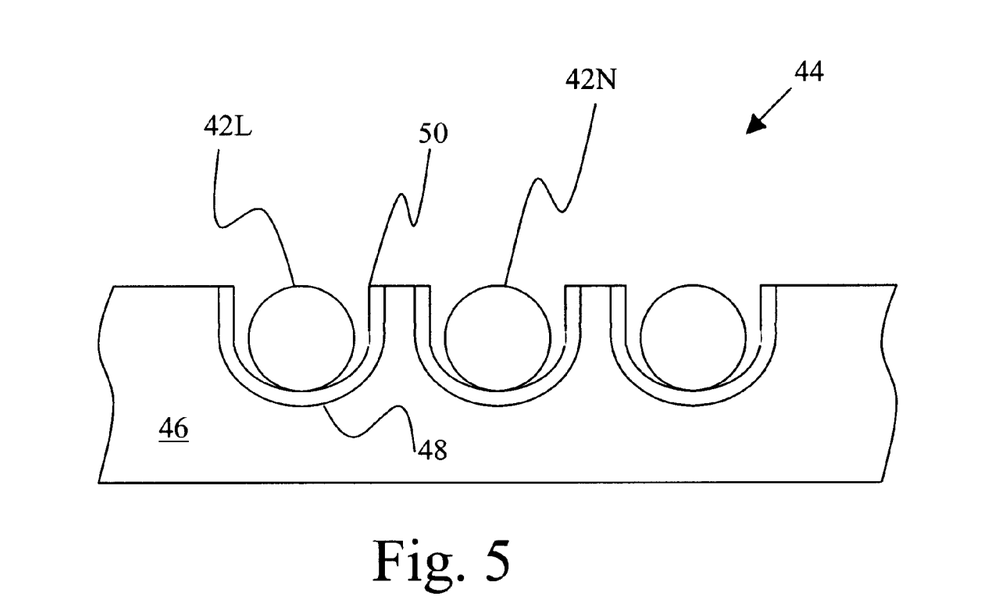

FIG. 5 shows an embodiment in which the mounting surface 48 includes the shield 50 to isolate the latchable component 42L. The mounting surface 48 and shield 50 are recessed in substrate 46 to provide a magnetically isolated moat or recess in which the component 42 may be mounted.

Figure 6:
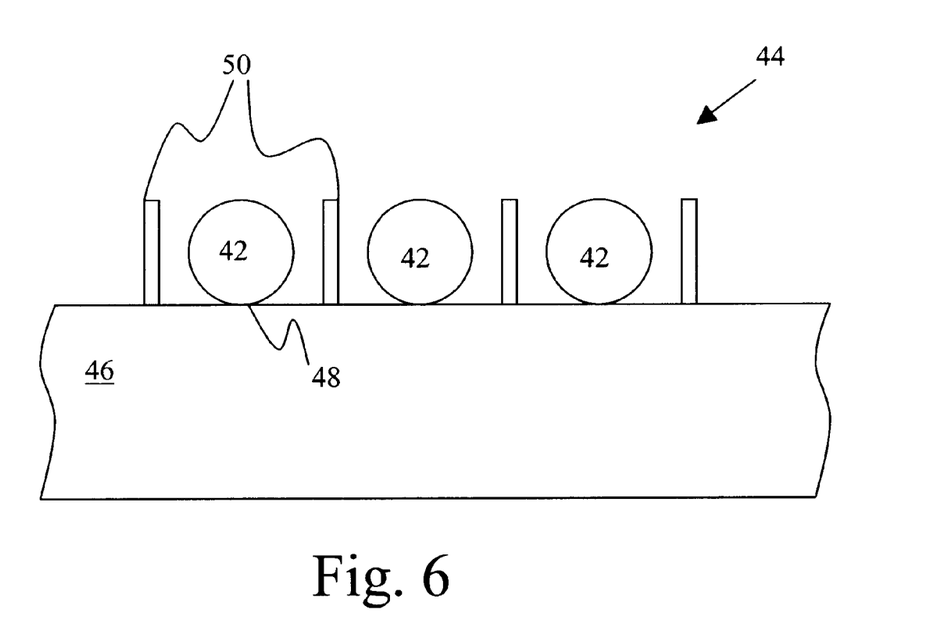

FIG. 6 shows an embodiment in which the substrate 46 includes magnetically isolating shields positioned between the mounting surfaces 48 to isolate each component 40 in the tray 44. It will be appreciated that both latchable component 42L and non-latchable components 42N may be mounted in the magnetically isolated embodiments exemplified by FIGS. 4 and 5.

Figure 7:
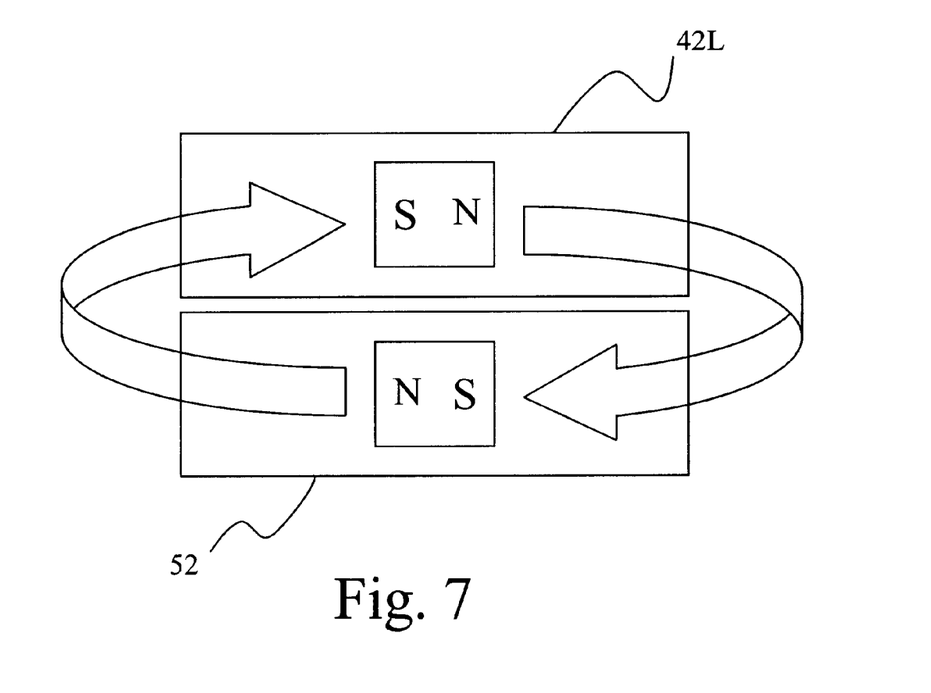

FIG. 7 shows an embodiment in which an isolating magnet 52 is provided proximate to the latchable component 42L. The isolating magnet 52 is positioned to provide a magnetic field that prevents magnetic interference of the magnetic orientation of the material by external magnetic field. As depicted in FIG. 6, the magnetic poles of the isolating magnet 52 generally are aligned with the magnetic poles of the latchable component 42L to maintain the latchable material in its current orientation. While the isolating magnet 52 is shown in a one to one relationship with the latchable optical components 42L, it will be appreciated that various ratios between latchable optical components 42L and isolating magnets 52 may be maintained depending upon the required magnetic isolation. For example, the one isolating magnet 52 may be used to isolate multiple latchable components 42L. It will be further appreciated that non-latchable components 42N with the proper magnetic properties may be employed as isolating magnets 52 upon proper configuration in the tray 44.

Those of ordinary skill in the art will appreciate that numerous modifications and variations that may be made to specific aspects of the present invention without departing from the scope of the present invention. For example, substrate 46 may include both planar and recessed mounting surfaces 48. The optical components 42 may be mounted simultaneously on both the planar and recessed mounting surfaces 48. It is intended that the foregoing specification and the following claims cover such modifications and variations.

What is claimed is:

1. An optical assembly, comprising:
   a substrate;
   a non-latching optical component attached to the substrate and including a non-latching garnet and a permanent magnet in magnetic communication with the garnet;
   a latching optical component attached to the substrate and including a latching garnet; and
   a magnetic shield between the non-latching optical component and the latching optical component.

2. The assembly of claim 1, wherein the substrate,is attached to a plurality of non-latching optical components and wherein the substrate is attached to a plurality of latching optical components.

3. The assembly of claim 1, wherein the latching and non-latching garnets are selected from a group consisting of GGG, YIG, and YAG.

4. The assembly of claim 1, wherein the non-latching and latching optical components have an optical property that is sensitive to a magnetic field.

5. The assembly of claim 1, further comprising an isolating magnet in magnetic communication with the latching optical component.

6. The assembly of claim 5, wherein the isolating magnet is oriented to suppress an external magnetic field from the permanent magnet in the non-latching optical component.

7. The assembly of claim 5, wherein the isolating magnet is oriented to provide a magnetic field that combines with a magnetic orientation of the latching garnet.

8. The assembly of claim 5, wherein the isolating magnet includes magnet poles, wherein the latching garnet includes magnetic poles, and wherein the magnetic poles of the isolating magnet are aligned with the magnetic poles of the latching garnet.

9. The assembly of claim 7, wherein a single magnet operates as both the isolating magnet and the permanent magnet.

10. An optical assembly, comprising:
   a substrate with a surface including both recesses and planar portion;
   a non-latching optical component attached to one of the recesses in the substrate and including a non-latching garnet and a permanent magnet in magnetic communication with the garnet;
   a latching optical component attached to another of the recesses in the substrate and including a latching garnet; and
   a magnetic shield within at least one of the recesses.

11. The assembly of claim 10, wherein a plurality of non-latching optical components are attached to a corresponding plurality of recesses and wherein a plurality of latching optical components are attached to the planar portion of the substrate.

12. The assembly of claim 10, wherein the latching optical component is attached to the recess in the substrate and wherein the recess includes the magnetic shield.

13. The assembly of claim 10, where all of the recesses included a magnetic shield.

14. The assembly of claim 10, wherein the latching and non-latching garnets are selected from a group consisting of GGG, YIG, and YAG.

15. The assembly of claim 10, wherein the non-latching and latching optical components exhibit an optical property that is sensitive to a magnetic field.

16. An optical assembly, comprising:
   a substrate including a surface;
   a non-latching optical component attached to the surface of the substrate and including a non-latching garnet and a permanent magnet in magnetic communication with the garnet;
   a latching optical component attached to the surface of the substrate and including a latching garnet; and
   a magnetic shield attached to the surface of the substrate and extending perpendicular to the surface of the substrate wherein the magnetic shield is between the non-latching optical component and the latching optical component.

17. The assembly of claim 16, wherein the substrate is attached to a plurality of non-latching optical components and wherein the substrate is attached to a plurality of latching optical components.

18. The assembly of claim 17, including a plurality of magnetic shields attached to the surface of the substrate and extending perpendicular to the surface, wherein each magnetic shield is between adjacent optical components.

19. The assembly of claim 16, wherein the latching and non-latching garnets are selected from a group consisting of GGG, YIG, and YAG.

20. The assembly of claim 16, wherein the non-latching and latching optical components exhibit an optical property that is sensitive to a magnetic field.

* * * * *